United States Patent
Tenenbaum et al.

[19]

[11] Patent Number: 5,990,915
[45] Date of Patent: Nov. 23, 1999

[54] TIME RECORDER WITH CODE READER AND DATA STORAGE

[75] Inventors: Radu R. Tenenbaum, Worcester; David R. Beaulieu, Groton; Peter J. Simone, Wellesley, all of Mass.; Russ S. Camacho, Nashua, N.H.

[73] Assignee: Simplex Time Recorder Co., Gardner, Mass.

[21] Appl. No.: 08/541,945

[22] Filed: Oct. 10, 1995

Related U.S. Application Data

[63] Continuation of application No. 08/259,045, Jun. 13, 1994, abandoned.

[51] Int. Cl.[6] .......................... G01D 15/04; G06K 13/00; G06K 5/00

[52] U.S. Cl. ............................ 346/82; 250/556; 235/477

[58] Field of Search ................................ 346/82, 74.2, 99, 346/133; 382/182, 183; 250/569, 556, 566; 235/462.01, 462.08, 449, 439, 470, 475, 477, 493

[56] References Cited

U.S. PATENT DOCUMENTS

| | | |
|---|---|---|
| 4,017,857 | 4/1977 | Evans, Jr. et al. .......................... 346/82 |
| 4,333,085 | 6/1982 | Witts ......................................... 346/76 |
| 4,361,092 | 11/1982 | Krakauer ................................. 101/426 |
| 4,506,274 | 3/1985 | Coe ........................................... 346/82 |
| 4,542,286 | 9/1985 | Golarz ....................................... 346/82 |
| 4,804,829 | 2/1989 | Jacobsen ................................. 235/377 |
| 5,046,157 | 9/1991 | Smith et al. ....................... 340/309.15 |

*Primary Examiner*—John Barlow
*Assistant Examiner*—Raquel Yvette Gordon
*Attorney, Agent, or Firm*—Hamilton, Brook, Smith & Reynolds, P.C.

[57] ABSTRACT

A time recorder receives bar coded time cards, punches time data on the cards and stores the time data in memory. Each card has a bar code at each end corresponding to the same value. For each pay period, a unique bar code and the card on which it is printed are assigned to each employee during an initialization process. A card is inserted upside down into the time recorder for each employee and the bar code is read by the system and assigned to an employee. At the same time, employee information is printed on the card.

14 Claims, 7 Drawing Sheets

FIG. 1

| IN | OUT | IN | OUT | IN | OUT | TI | T2 |
|----|-----|----|----|----|-----|----|----|
|    |     |    |    |    |     |    |    |

PAY PERIOD TOTALS

| 0856 | TENENBAUM,R | | EM | 05/23/94 - 05/29/94 | | | |
|---|---|---|---|---|---|---|---|
| IN | OUT | IN | OUT | IN | OUT | T1 | T2 |
| FR 08:12 | 13:01 | | | | | 4:48 | 0:00 |
| TH 08:12 | 16:56 | | | | | 8:00 | 0:42 |
| WE 07:26 | 17:26 | | | | | 8:00 | 2:00 |
| TU 08:21 | 12:32 | 12:56 | 17:46 | | | 8:00 | 1:06 |
| MO 08:31 | 12:09 | 13:02 | 18:30 | | | 8:00 | 1:06 |

R=36:48  OT1=4:54  OT2=0:00  PT1=0:00  T=41:42

PAY PERIOD TOTALS

FIG. 6 a card path, and a printer for printing on the card. An electronic controller which responds to the code reader and controls the printer is operative in both an initialization mode and a time recording mode. In the initialization mode, the controller reads the code on a card and assigns the code to an individual whose identifier is stored in memory. The controller then causes information regarding the individual to be printed on the time card. For the remainder of the pay period, in a recording mode, the time recorder recognizes the code as having been assigned to the particular individual and stores the punch times accordingly. The time recorder also prints the time data on the card as the employee punches in and out.

TIME RECORDER WITH CODE READER AND DATA STORAGE

This application is a continuation of application Ser. No. 08/259,045 filed Jun. 13, 1994, now abandoned.

BACKGROUND

Punch card type time recorders are in widespread use for tracking working hours of employees. Typically, a time card for each employee is prepared for each pay period such as a week. The employee punches in and out by selecting his card from a rack and placing it in the time recorder which prints (punches) the time and perhaps the day of the week or the date. At the end of the pay period, the cards are collected and the work hours are manually compiled to create totals of regular and overtime hours. A new card is also prepared for each employee for the next pay period.

To avoid the manual compilation of the time data, systems have been introduced which store the in and out times for each employee in memory. Cards are still used to maintain a paper record. For the electronics system to maintain the time record in memory, the employee must identify himself to the electronics as he punches in and out. To that end, information regarding the employee is input to the system along with that employee's number. Employee numbers have been encoded on punch cards in machine readable form. For each pay period, the user purchases a block of punch cards which are sequentially numbered and encoded, the number of cards in a block of cards being at least as great as the number of employees.

Yet another approach has been the use of cards having machine readable magnetic stripes. The employee number and other information is magnetically encoded on the card by the time recorder and is later read by the time recorder each time the employee punches in and out.

SUMMARY OF THE INVENTION

The time recorder of the present invention utilizes sequentially numbered cards with the numbers pre-encoded on the cards in machine readable form, preferably in bar code. However, the present invention avoids problems which have been suffered by prior systems of that type. In prior systems, a new block of encoded cards was required for each pay period and the blocks were of incremental sizes. For example, if there were 15 employees, an employer might be required to purchase a block of 25 cards for each pay period and ten of those 25 cards would be disposed of wastefully. Further, if one card in a block of cards was damaged, a single replacement card for that employee would not be available, so an entire block of cards would have to be purchased. To overcome those problems, the present invention does not preassign each employee with a number encoded on the card. Rather, during an initialization process, the time recorder sequentially reads the numbers encoded on individual cards and assigns each number which is read to an individual. Since the initialization process is repeated at the beginning of each pay period, there is no requirement that specific numbers be carried forward for employees from pay period to pay period. Thus, a large block of sequentially encoded cards may be purchased and used through successive pay periods. No cards need be wasted. Further, if a card in the sequence is damaged or lost, the system merely receives the next card and assigns the next number to the next employee; the card need not be replaced.

In accordance with the present invention, a time recorder comprises a code reader for reading a code on the card in a Preferably, the card is encoded with bar code and bar codes corresponding to a common value are printed at each end of the card on the back side so that the bar code can be read whether the card is inserted right side up or upside down. By orienting the two codes in the same direction on the card, the controller can determine the orientation of the card as it is inserted. By centering the bar codes, both codes can be printed and read by common printers and readers.

Preferably, the controller is also operative in a card replacement mode. In that mode, the controller reads the code on the card, assigns the code as a replacement code to an individual identifier stored in memory, prints the individual identifier on the card and prints time data on the card.

Three sets of codes may be assigned to the individuals at any one time. One set is for a previous pay period to enable printing of totals on employee time cards throughout the current pay period. The next set is for the current pay period for storing current time data. The final set is that of codes for the next pay period. At the end of a pay period, the current codes automatically become the previous codes, and the next codes automatically become the current codes.

Each time card of a block of time cards embodying the present invention includes markings which designate regions for in and out time punches. A bar code is provided at each end of the card. The bar codes correspond to a common identifier which uniquely identifies the card within a large block of cards.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
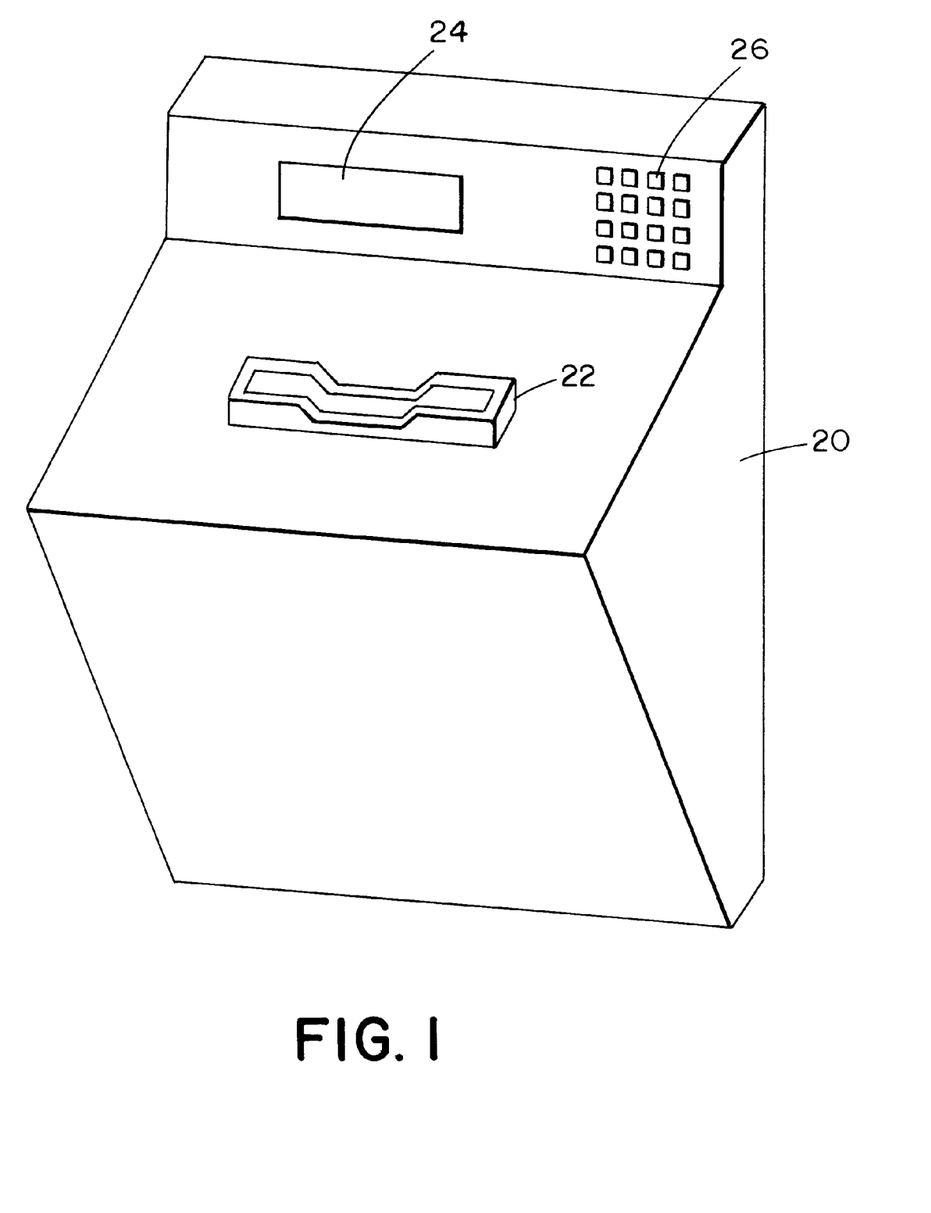
FIG. 1 is a perspective view at a time recorder embodying the present invention.

As illustrated in FIG. 1, a time recorder embodying the present invention comprises a housing 20 adapted to be mounted to a wall. It includes a card slot 22 in which an employee vertically inserts a time card illustrated in FIGS. 2A–C. The time recorder also includes a display 24 which provides prompts to a user and a key pad 26 used by a supervisor in programming the system or initializing time cards as described below.

Figure 2A:
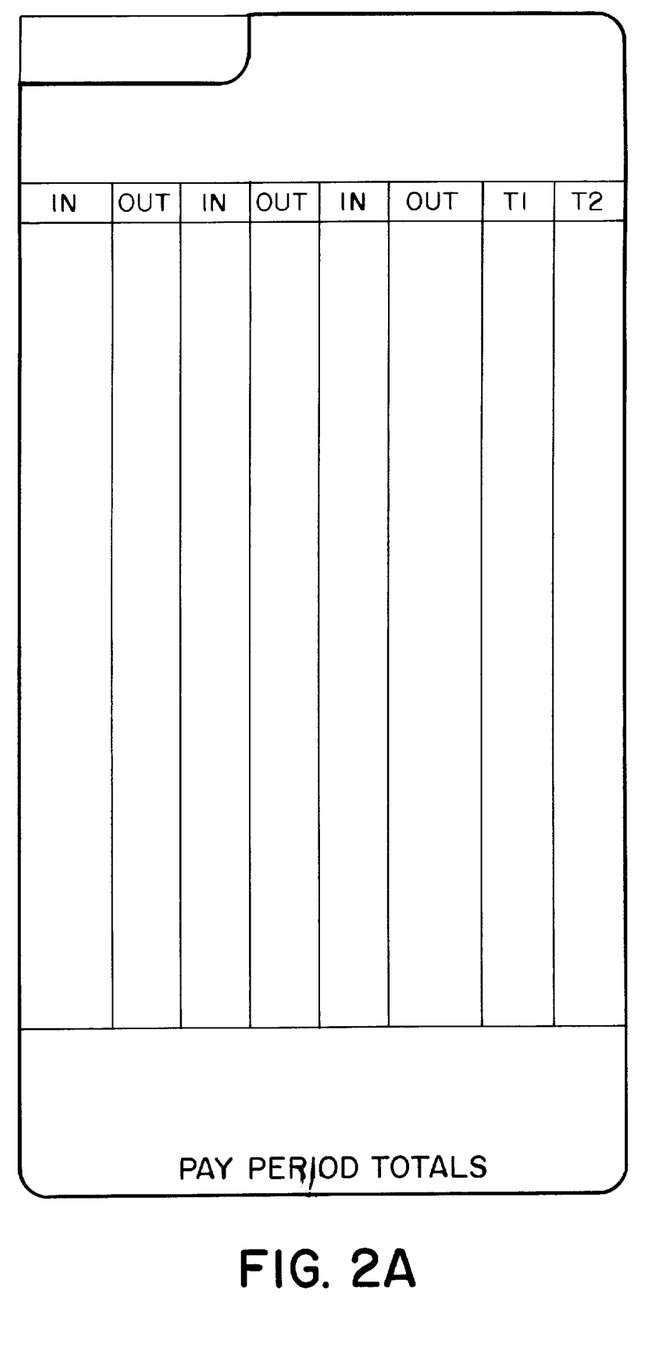
FIG. 2A illustrates the front side of a time card embodying the present invention.
Figure 2B:
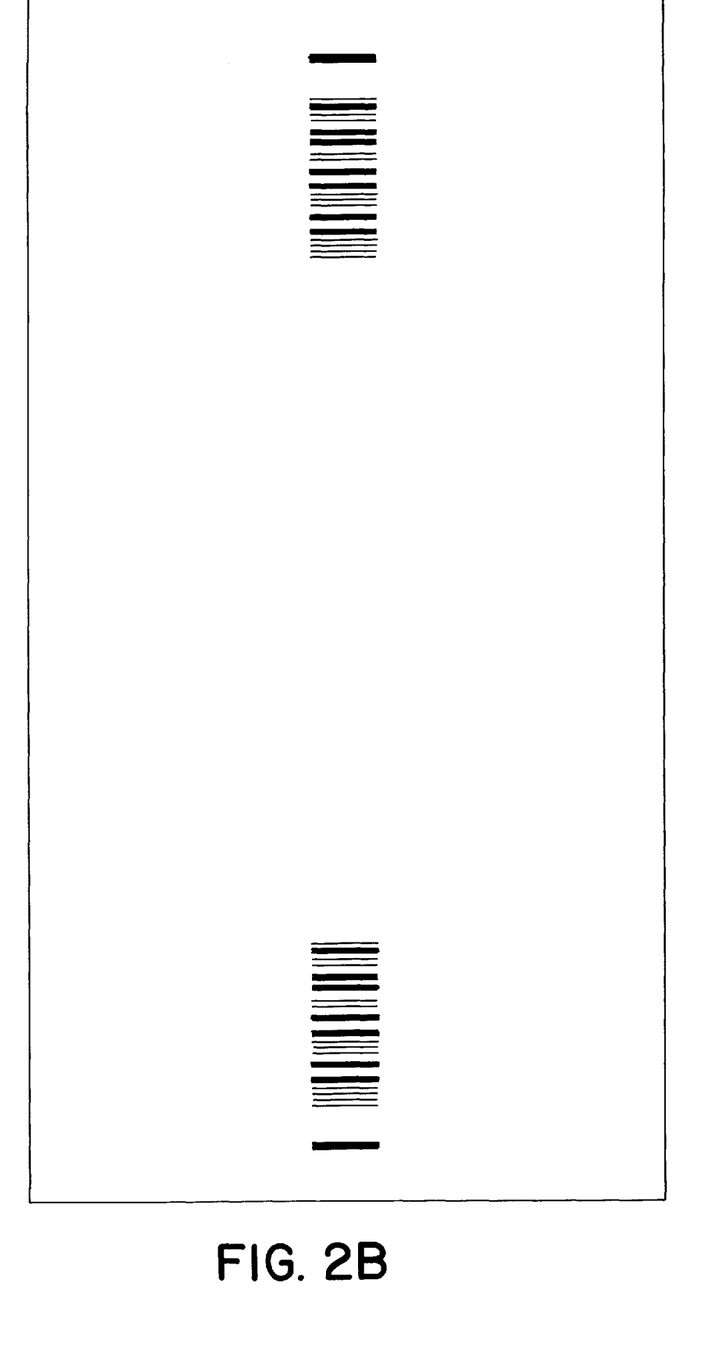
FIG. 2B illustrates the bar code on the back side of the card of FIG. 2A.

As illustrated in FIG. 2A, a time card includes on its front face a number of vertical lines which designate regions for in and out time punches. On the back side of the card as illustrated in FIG. 2B, a bar code is provided at each end of the card. The bar code may, for example, be standard Interleaved 2 of 5 bar code. The two bar codes uniquely identify the card within a large block of cards. For example, the block may be of values ranging from 0 to 999,999. The two bar coded numbers correspond to a common underlying value but, due to the use of different encryption algorithms, may appear differently.

In the particular format of bar code used, the orientation of the bar code is determined by the first two lines at each end of the code. Specifically, one end has two narrow lines and the other has a narrow line and a wide line. It can be seen that both bar codes are oriented in the same direction. Thus, if inserted in a normal direction for punching time records, the system senses that the time card is right side up, but if the card is reversed such that the other code is read, the system is able to sense the upside down orientation.

By positioning both bar codes near the center of the card, they can both be printed and read by common printers and readers. The bar codes are presented on the back side of the card to avoid interference with the time punch regions.

Figure 2C:
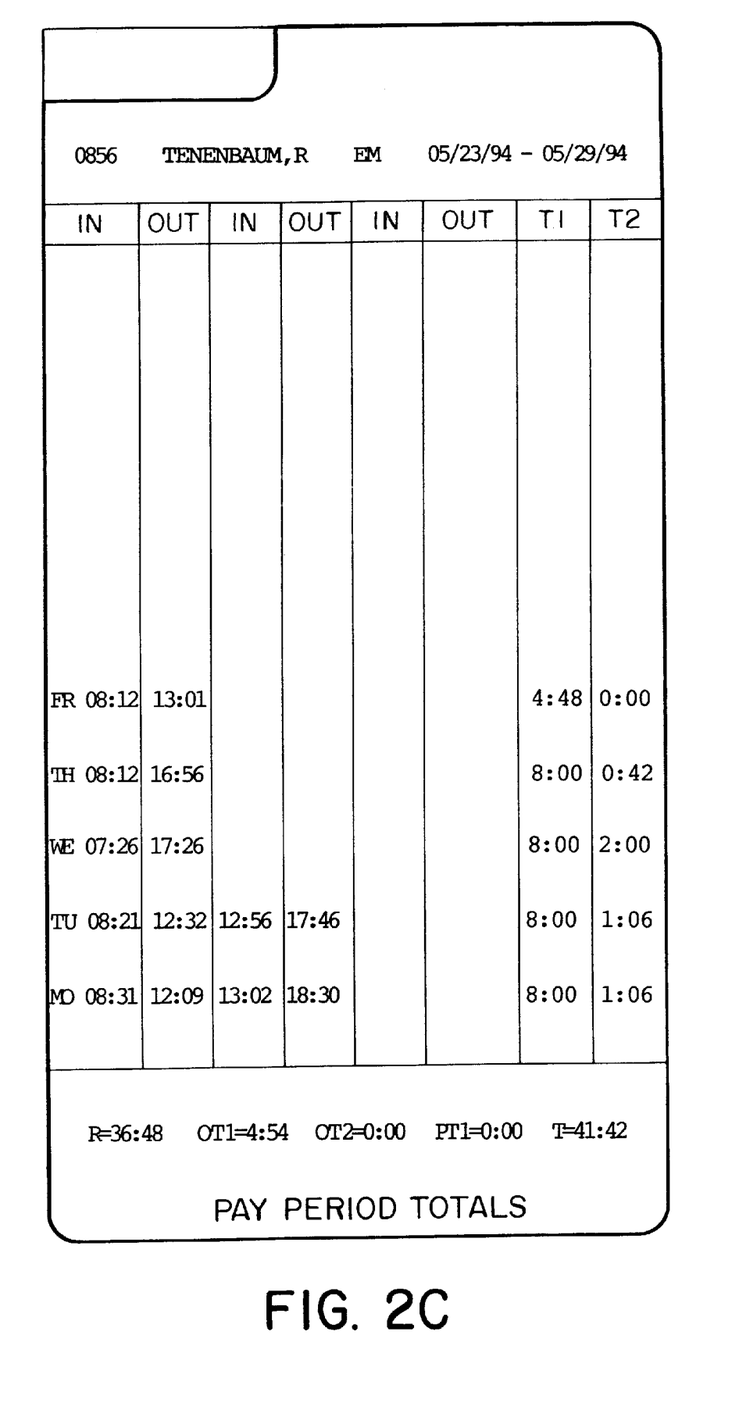
FIG. 2C illustrates the card of FIG. 2A with an illustrative time record.

FIG. 2C illustrates a card for an employee R. Tenenbaum, employee number 0856 and department EM, for the pay period May 23, 1994 to May 29, 1994. During an initialization process to be described below, that information is printed at the top of the card. The in and out times for each day of the pay period are printed along a line, the card allowing for three in/out pairs on a line. At the end of a day or pay period, the total regular hours T1 and overtime hours T2 are computed by the time recorder and printed in the right two columns for each day. At the end of the pay period, at the request of a supervisor, the system totals the regular and overtime hours and prints them at the bottom of the card.

Figure 3:
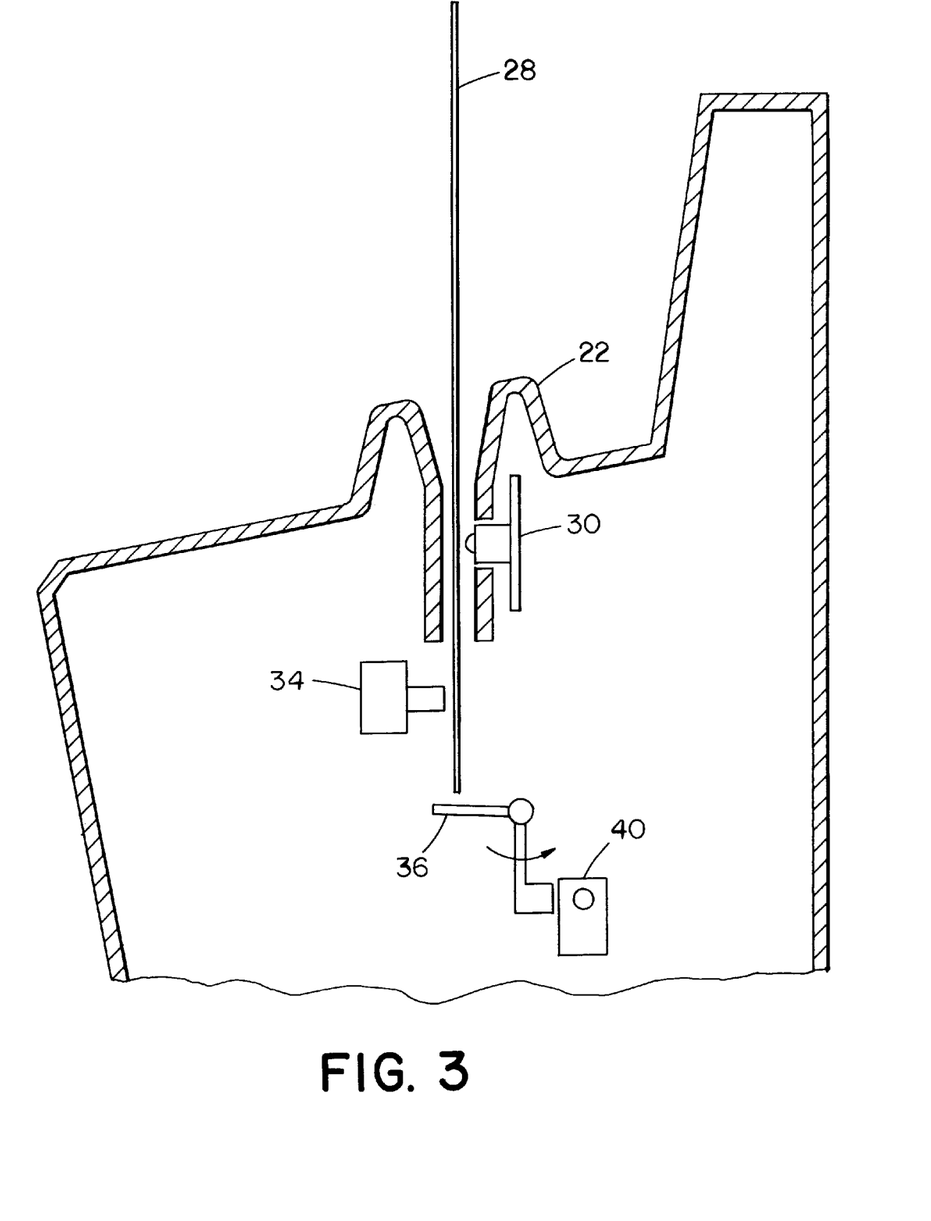
FIG. 3 is a simplified cross-sectional view of the time recorder of FIG. 1.
Figure 4:
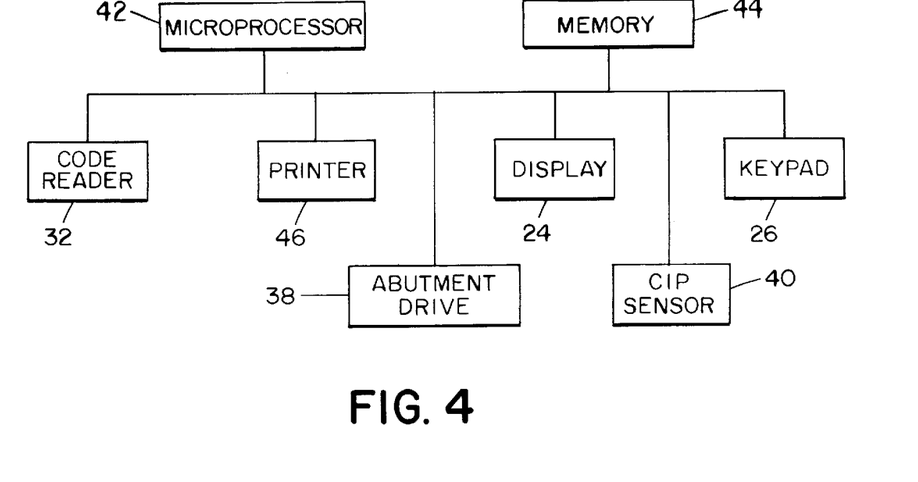
FIG. 4 is an electrical block diagram of the electronics of the time recorder of FIG. 1.

FIG. 3 is a simplified cross-sectional view of the time recorder. In use, the employee drops a card 28 into the card receiver slot 22. The card passes the bar code sensor 30 for reading of the code by the code reader 32 (FIG. 4) as the card descends into the recorder. The card also passes a print head 34. The print head 34 is a dot matrix printer which either spans the full width of the card or may be shifted horizontally to print across the card. The card comes to rest on a vertical abutment 36 which is shifted vertically by an abutment drive 38 (FIG. 4). The drive may be either a linear or rotary motor drive. By adjusting the height of the vertical abutment 36, the line on which the print head prints is determined. The vertical abutment 36 is associated with a card in place (CIP) sensor 40.

As illustrated in FIG. 4, the electronics of the time recorder includes a microprocessor 42 which is associated with memory 44 for storing the processor program and data. The microprocessor responds to the key pad 26, code reader 32 and CIP sensor 40 to control the display 24, printer controller 46, and abutment drive 38.

A summary of the operation of the system in its various modes is as follows. The different operating modes are selected using a prompt driven interface via the key pad and the alphanumeric display. The operating mode and the calendar data determine the vertical position of the vertical abutment and the card is manually inserted into the card receiver slot as far as is allowed by the position of the vertical abutment. As the card is inserted into the receiver, the bar code on the back of the card passes in front of the bar code sensor 30 and the bar code value of the card is decoded. When the card bottoms out against the vertical abutment 36, it activates the card in place sensor 40. Depending on the value of the bar code, the date and time and the program mode of the system, the print head prints the appropriate information on the card. After the print cycle is completed, a beeper sounds indicating to the user that the card may be removed. In addition to printing the punch times and the elapsed totals, the system can also be used to print supervisor reports and program parameters on blank cards.

More specifically, during system setup, a supervisor gains access to the supervisor functions by inputting a code through the key pad 26. At that time, the supervisor selects various system parameters such as output format, pay periods and the like. Also, the supervisor enters employee information for each employee. That information includes at least the employee's name and ID number and generally remains unchanged, but for changes in employee status, from pay period to pay period.

At the beginning of each pay period, the supervisor gains access to the time recorder using his personal code to enter an initialization process by which each employee is associated with a particular time card for that time period. Regardless of the number of employees, time cards are purchased in large blocks of sequentially encoded cards. For example, a box of a thousand cards may be purchased for any range of a thousand bar coded numbers within the overall range of 0 to 999,999. The actual sequence of cards in a box is not critical. It is only important that cards not be duplicated within a time period. Even duplicate cards which may inadvertently be included in a box can be rejected by the time recorder if an employee has already been assigned to the duplicate bar code for that pay period. Nor do missing cards present a concern.

Figure 5:
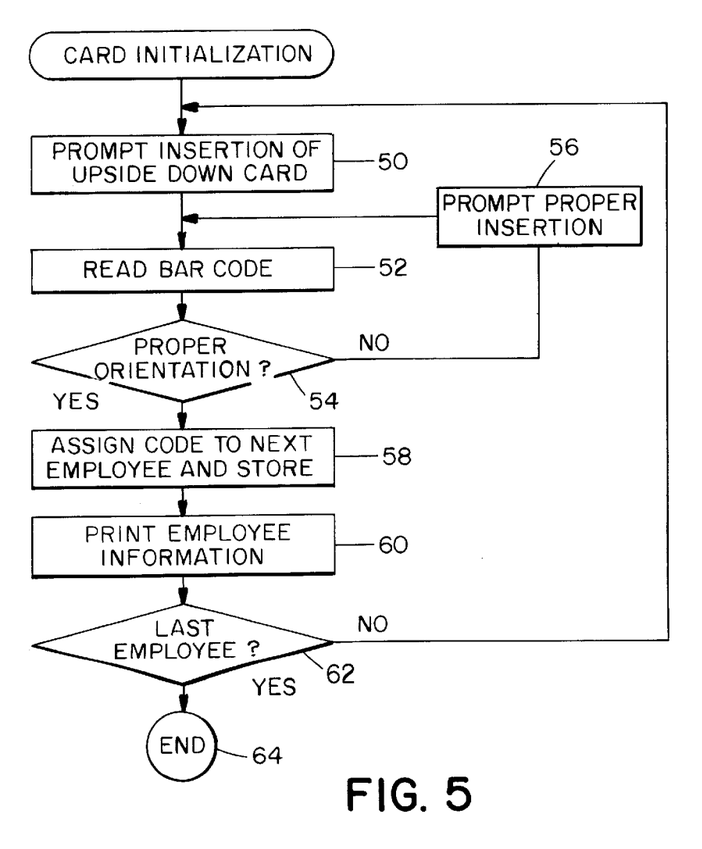
FIG. 5 is a flow chart illustrating a card initialization procedure using the time recorder of FIG. 1.

The card initialization process is illustrated by the flow chart of FIG. 5. At 50, by means of the display 24, the time recorder prompts the supervisor to insert a card upside down into the slot 22. The bar code is read at 52. The orientation of the bar card and thus of the card is checked at 54. If the card was not oriented upside down, the system prompts the supervisor to reinsert the card at 56. With proper orientation, the time recorder assigns the code on that card to the next employee on the list of employees and stores that code in memory for that employee and that time period at 58. At 60, the printer 46 prints the employee's name, ID number, department code and pay period at the top of the card. Because the print head 34 is a dot matrix print head, that information may be printed upside down such that it is ultimately right side up on the card. With the card is inserted upside down, information may be printed near the top edge of the card without dropping the card out of grasp in the slot 22.

Once the employee information is printed on the card, the supervisor removes the card. At 62, the system checks to determine whether all employees have been assigned a card with its bar code for that pay period. If not, the supervisor is prompted to insert a new card, again upside down, at 50. If all employees have been assigned bar codes with their personal information printed on the corresponding cards, the initialization process is ended at 64.

The system maintains three card numbers for each employee. By retaining the card number for the previous pay period with associated time data, totals of the previous pay period may be printed at any time during the current pay period. Current period numbers are used for punching each employee's card in and out through the current pay period. The next period's card numbers can be programmed at any time during the current pay period. At the end of each pay period, the system automatically reassigns the card numbers between the three groups. The previous period's card numbers are purged, the current period's card numbers become the previous period's card numbers, the next period's card numbers become the current period's card numbers, and new next period card numbers are initialized as blanks.

With each employee's card having been printed, the cards are made available to the employees on a rack. Throughout the week, the employee punches in and out by simply inserting the card. The vertical abutment is positioned according to the day of the pay period to select the appropriate print line. The time recorder identifies the employee through the bar code on the card. Based on the stored time data, the time recorder orients the print head to select the appropriate column and prints the time in the appropriate in and out region. At the end of a day, the employee may request that totals be printed in the T1 and T2 columns.

At the end of a pay period, the supervisor may again enter the time recorder to generate the necessary pay reports. The first set of reports provides employee totals which are printed on employees' cards for that week. The system prompts the supervisor to insert a time card. The system identifies the inserted card by its bar code, and the totals for that pay period are then printed across the bottom of the card as illustrated in FIG. 2C. The supervisor is then prompted to insert the next time card. A report is thus obtained on each employee's time card.

A summary report may also be printed. That report is printed on a blank time card without regard for the bar code on the card. The supervisor is prompted to insert the card, and the system prints the totals from memory for each employee. If more than one card is required, the system prompts the supervisor to insert the new card. Group totals for all employees in a group, such as a department, are printed at the end of the summary report. The system may also allow the supervisor to obtain other reports on blank time card such as a list of employees who are punched in, a list of employees who are punched out and a list of the various schedules, parameters and employee data bases programmed into the system.

Figure 6:
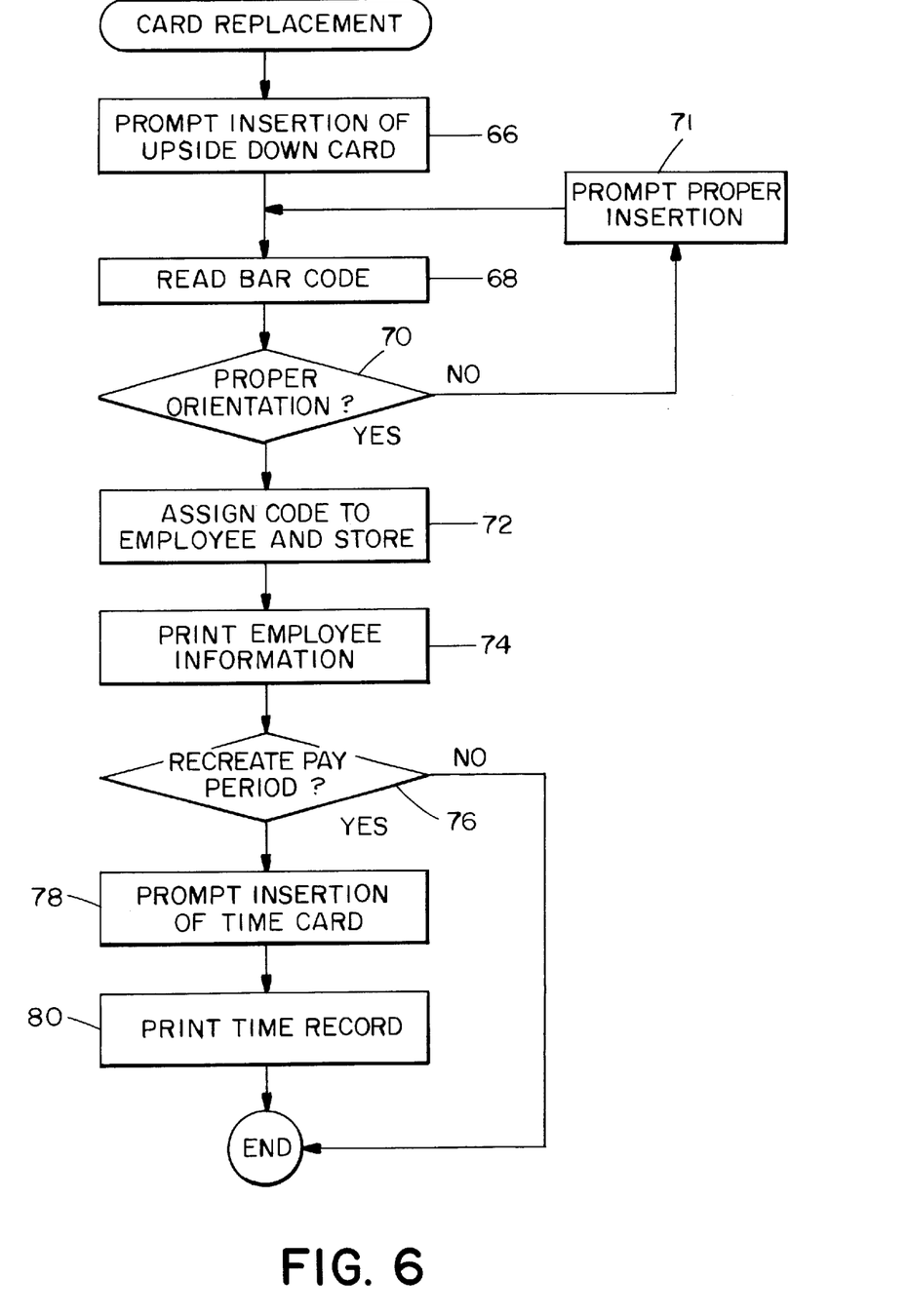
FIG. 6 is a flow chart illustrating a card replacement procedure using the time recorder of FIG. 1.

If during the pay period a card is damaged or misplaced, it may be replaced by the supervisor. A flow chart for the replacement process is presented in FIG. 6. As in the initial card initialization process, the system prompts the supervisor to insert an upside down card at 66. The bar code is read as the card is inserted at 68 and the proper orientation is checked at 70. If the card was not inserted upside down, a prompt for proper insertion is provided at 71. With proper insertion, the code assigned to the employee is replaced by the code read from this new card at 72. The employee information is printed at the top of the card at 74. Through a prompt, the system asks whether the time data for the full pay period should be recreated at 76. If the supervisor responds yes, he is prompted to insert a new card right side up at 78. The full time record is printed at 80.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A time recorder comprising:

a card path for receiving a time card having a bar code at a top end and a bar code at a bottom end of the card corresponding to a common underlying value, the bar code at said top end and the bar code at said bottom end of the card indicating orientation of the card;

a printer for printing on the time card in the card path;

a bar code reader for reading the bar code at said top end and the bar code at the bottom end of the time card inserted into the card path; and an electronic controller having memory responding to the code reader and controlling the printer, and operative in an initialization mode at a time recording mode:

the controller in the initialization mode responding to the bar code at said top end and the bar code at said bottom end to assure that the time card has been inserted upside down into the card path such that the bar code at the top end is read, assigning the bar code at said top end read by the code reader to an individual identifier stored in the memory and engaging the printer to print the individual identifier upside down on the time card near the top end thereof; and the controller in the time recording mode responding to the bar code at the bottom end of the card, storing time data in the memory for the individual identifier to which the bar code at said bottom end read by the code reader is assigned and engaging the printer to print the time data on the time card in an upright orientation.

2. A time recorder as claimed in claim 1 wherein the bar code is centered at each end of the card.

3. A time recorder as claimed in claim 1 wherein the electronic controller is further operative in a card replacement mode in which the controller reads the bar code on the card, responds to the bar code to assure that the time card has been inserted upside down into the card path such that the bar code at the top end is read, assigns the code as a replacement code to an individual identifier stored in memory, and engages the printer to print the individual identifier and time data upside down on the card.

4. A time recorder as claimed in claim 3 wherein the controller in the replacement mode causes a display on the recorder to prompt a user to reinsert the time card upside down if the card was inserted in an upright orientation.

5. A time recorder as claimed in claim 1 wherein the electronic controller maintains at least three sets of codes assigned to the individual identifiers, the sets of codes including codes for a previous pay period to enable printing of totals on employee time cards, codes for a current pay period for storing current time data and codes for a next pay period.

6. A time recorder as claimed in claim 5 wherein, at the end of a pay period, the codes for the current pay period automatically become the codes for the previous pay period and the codes for the next pay period automatically become the codes for the current pay period.

7. A time recorder as claimed in claim 1 wherein the controller in the initialization mode causes a display on the recorder to prompt a user to reinsert the time card upside down if the card was inserted in an upright orientation.

8. A time recorder comprising:

a time card in a card path, the time card having a bar code at a top end and a bar code at a bottom end thereof, each bar code corresponding to a common underlying value and being centered at each end of the card and indicating orientation of the card;

a printer for printing on the card in the card path;

a card reader for reading either bar code on the card in the card path; and an electronic controller responding to the code reader and controlling the printer, and operative in an initialization mode, a time recording mode and a card replacement mode:

the controller in the initialization mode responding to either bar code to assure that the time card has been inserted upside down into the card path such that the bar code at the top end is read, assigning the code read by the card reader to an individual identifier stored in memory and engaging the printer to print the individual identifier upside down on the time card near the top end thereof;

the controller in the time recording mode responding to the bar code at the bottom end of the card, storing time data for the individual identifier to which the code read by the card reader is assigned and engaging the printer to print the time data on the card; and the controller in the card replacement mode responding to either bar code to assure that the time card has been inserted upside down into the card path such that the bar code at the top end is read, assigning the code read by the card reader as a replacement code to an individual identifier stored in memory, and engaging the printer to print time data and the individual identifier upside down on the card near the top end thereof.

9. A time recorder as claimed in claim 8 wherein the electronic controller maintains at least three sets of codes assigned to the individual identifiers, the sets of codes including codes for a previous pay period to enable printing of totals on employee time cards, codes for a current pay period for storing current time data and codes for a next pay period, the controller, at the end of a pay period, automatically causing current codes to become previous codes and the next codes to become the current codes.

10. A method of time recording comprising:

programming a time recorder to have stored in memory a list of employees;

providing a block of cards, each card having a unique bar code at a top end and a unique bar code at a bottom end of the card such that either bar code indicates orientation of the card relative to the code reader;

initializing a set of cards from the block of cards for the list of employees by individually inserting each time card into a card path of the time recorder, the time recorder reading either bar code on the card, responding to either bar code to assure that the time card has been inserted upside down into the card path such that the bar code at the top end is read, assigning the code to an individual from the list and printing an individual identifier on the time card; and during a pay period, individually inserting time cards into the time recorder to punch in and out, the time recorder reading the code at the bottom end of the card, storing time data for the individual to which the code is assigned and printing the time data on the card in an upright orientation.

11. A method as claimed in claim 10 further comprising replacing a card by reading the code on a new card, responding to the bar code to assure that the time card has been inserted upside down into the card path such that the bar code at the top end is read, assigning the code as a replacement code to an individual identifier stored in memory, printing the individual identifier on the card and printing time data on the card.

12. A method as claimed in claim 10 further comprising maintaining at least three sets of codes assigned to the individual identifiers, including a set of codes for a previous pay period to enable printing of totals on employee time cards, a set of codes for a current pay period for storing current time data and a set of codes for a next time period.

13. A method as claimed in claim 12 further comprising automatically, at an end of a pay period, causing current codes to become previous codes and next codes to become current codes.

14. A method of time recording comprising:

programming a time recorder to have stored in memory a list of employees;

providing a block of time cards, each time card having a bar code at a top end and a bar code at a bottom end thereof, each bar code corresponding to a common underlying value and being centered at each end of the time card and indicating orientation of the time card;

initializing a set of time cards from the block of time cards for the list of employees by individually inserting each time card upside down into the time recorder, the time recorder responding to either bar code to assure that the time card has been inserted upside down into the card path such that the bar code at the top end is read, assigning the code to an individual from the list and printing an individual identifier upside down on the time card near the top end thereof;

during a pay period, individually inserting time cards into the time recorder to punch in and out, the time recorder reading the code at the bottom end of the time card, storing time data for the individual to which the code is assigned and printing the time data on the time card; and replacing individual time cards by inserting a time card upside down into the time recorder, the time recorder responding to either bar code to assure that the time card has been inserted upside down into the card path such that the bar code at the top end is read, assigning the code to the individual for which the time card is being replaced and printing an individual identifier upside down on the time card near the top end thereof, and reinserting the time card right side up and printing time data on the time card.

* * * * *